(12) United States Patent
Murrow et al.

(10) Patent No.: US 7,905,084 B2
(45) Date of Patent: Mar. 15, 2011

(54) ROTARY PRESSURE RISE COMBUSTOR FOR A GAS TURBINE ENGINE

(75) Inventors: Kurt David Murrow, Liberty Township, OH (US); Matthew Timothy Franer, Norwood, OH (US); Rollin George Giffin, III, Cincinnati, OH (US)

(73) Assignee: General Electronic Company, Schenectady, NY (US)

( * ) Notice: Subject to any disclaimer, the term of this patent is extended or adjusted under 35 U.S.C. 154(b) by 706 days.

(21) Appl. No.: 12/024,528

(22) Filed: Feb. 1, 2008

(65) Prior Publication Data
US 2009/0196733 A1  Aug. 6, 2009

(51) Int. Cl.
*F02K 5/02* (2006.01)
*F02K 7/00* (2006.01)
(52) U.S. Cl. .................. 60/247; 60/39.34; 60/39.38
(58) Field of Classification Search ............ 60/247, 60/39.38, 39.39, 39.78, 39.34, 39.35
See application file for complete search history.

(56) References Cited

U.S. PATENT DOCUMENTS

| | | | | |
|---|---|---|---|---|
| 756,210 | A * | 4/1904 | Butler | 415/75 |
| 2,553,548 | A * | 5/1951 | Pawl et al. | 123/241 |
| 3,175,359 | A * | 3/1965 | Szlechter | 60/39.45 |
| 3,386,245 | A * | 6/1968 | Gamage | 376/391 |
| 3,556,670 | A * | 1/1971 | Tucker | 415/75 |
| 3,693,601 | A * | 9/1972 | Sauder | 123/203 |
| 3,938,915 | A * | 2/1976 | Olofsson | 418/9 |
| 3,947,163 | A * | 3/1976 | Olofsson | 418/203 |
| 4,222,231 | A * | 9/1980 | Linn | 60/39.45 |
| 4,482,305 | A * | 11/1984 | Natkai et al. | 418/48 |
| 4,603,549 | A * | 8/1986 | Albrecht | 60/791 |
| 4,912,924 | A * | 4/1990 | Stockwell | 60/39.45 |
| 5,345,758 | A | 9/1994 | Bussing | |
| 5,901,550 | A | 5/1999 | Bussing et al. | |
| 6,505,462 | B2 | 1/2003 | Meholic | |
| 6,845,620 | B2 * | 1/2005 | Nalim | 60/776 |
| 6,889,505 | B2 | 5/2005 | Butler et al. | |
| 6,928,804 | B2 | 8/2005 | Venkataramani et al. | |
| 6,931,858 | B2 | 8/2005 | Venkataramani et al. | |
| 7,530,217 | B2 * | 5/2009 | Murrow et al. | 60/39.45 |

(Continued)

*Primary Examiner* — William H Rodriguez
(74) *Attorney, Agent, or Firm* — General Electric Company; William Scott Andes

(57) ABSTRACT

A gas generator for providing continuous pressure rise combustion, including: a rotatable member including a forward end, an aft end, a circumferential wall and a longitudinal centerline axis extending therethrough; an outer circumferential wall, wherein the rotatable member is positioned therein so that the circumferential wall of the rotatable member is spaced radially inwardly from the outer circumferential wall; at least one helical channel formed by a plurality of helical sidewalls extending between the circumferential wall of the rotatable member and the outer circumferential wall, each helical channel being open at the forward end and the aft end of the rotatable member so as to provide flow communication therethrough; an air supply for providing air to each helical channel; and, a fuel supply for providing fuel to each helical channel. Each helical channel includes an inlet portion having a first cross-sectional area for receiving a flow having a designated shape and orientation, a throat portion downstream of the inlet portion having a second cross-section less than the first cross-section of the inlet portion, and a diffusion portion downstream of the throat portion having a third cross-section greater than the second cross-section of the throat portion. A device is also positioned downstream from the diffusion portion of each helical channel for holding flame therein. A mixture of the fuel and air is continuously combusted downstream of the diffusion portion of each helical channel in a manner such that combustion gases exit therefrom with an increased pressure and temperature.

20 Claims, 10 Drawing Sheets

U.S. PATENT DOCUMENTS

| | | | |
|---|---|---|---|
| 7,621,118 B2 * | 11/2009 | Snyder et al. | 60/247 |
| 7,707,815 B2 * | 5/2010 | Murrow et al. | 60/39.45 |
| 2004/0208740 A1 * | 10/2004 | Hubbard | 415/72 |
| 2009/0193786 A1 * | 8/2009 | Murrow et al. | 60/39.78 |
| 2009/0322102 A1 * | 12/2009 | Lu et al. | 290/40 R |
| 2010/0242435 A1 * | 9/2010 | Guinan et al. | 60/247 |

* cited by examiner

ROTARY PRESSURE RISE COMBUSTOR FOR A GAS TURBINE ENGINE

CROSS-REFERENCE TO RELATED APPLICATION

The present application is related to an application entitled "System And Method For Continuous Detonation In A Gas Turbine Engine," having Ser. No. 12/024,592, which is filed concurrently herewith and is owned by the assignee of the present invention.

BACKGROUND OF THE INVENTION

The present invention relates generally to a system and method of propulsion in a gas turbine engine and, in particular, to a system and method of propulsion in a gas turbine engine which provides continuous pressure rise combustion.

It is well known that typical gas turbine engines are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are becoming increasingly costly to obtain.

Accordingly, improvements in engine efficiency have been sought by modifying the engine architecture such that the combustion occurs as a detonation in either a continuous or pulsed mode. Most pulse detonation devices employ detonation tubes that are fed with a fuel/air mixture that is subsequently ignited. A combustion pressure wave is then produced, which transitions into a detonation wave (i.e., a fast moving shock wave closely coupled to the reaction zone). The products of combustion follow the detonation wave at the speed of sound relative to the detonation wave and at significantly elevated pressure. Such combustion products then exit through a nozzle to produce thrust. Examples of a pulse detonation engine are disclosed in U.S. Pat. Nos. 5,345,758 to Bussing and 5,901,550 to Bussing et al.

It will be appreciated that the related 12/024,592 application has a similar configuration to the gas generator of the present invention and employs helical channels having a symmetrical configuration. Nevertheless, the 12/024,592 application depends upon suspending a strong detonation wave within the helical channels on board a rotor member or suspending an oblique shock wave followed by a region of supersonic combustion within the helical channels. The design challenges associated with this concept make near-term application unlikely.

Accordingly, it would be desirable for a mechanism to be developed which sustains continuous pressure rise combustion of a fuel-air mixture within a compact device while mitigating the challenges associated with prior approaches. At the same time, a steady surrounding flow field is promoted, gases upstream and downstream of the device are isolated, and a high enthalpy exit flow ready to do work is produced. Further, it would be desirable for such continuous pressure rise combustion system to be adaptable to a gas turbine engine for both aeronautical and industrial applications so as to provide a substitute for a combustor or possibly eliminate the entire core (i.e., a high pressure compressor, combustor, and high pressure turbine).

BRIEF SUMMARY OF THE INVENTION

In accordance with a first exemplary embodiment of the invention, a gas generator for providing continuous pressure rise combustion is disclosed as including: a rotatable member including a forward end, an aft end, a circumferential wall and a longitudinal centerline axis extending therethrough; an outer circumferential wall, wherein the rotatable member is positioned therein so that the circumferential wall of the rotatable member is spaced radially inwardly from the outer circumferential wall; at least one helical channel formed by a plurality of sidewalls extending between the circumferential wall of the rotatable member and the outer circumferential wall, each helical channel being open at the forward end and the aft end of the rotatable member so as to provide flow communication therethrough; an air supply for providing air to each helical channel; and, a fuel supply for providing fuel to each helical channel. Each helical channel includes an inlet portion having a first cross-sectional area for receiving a flow having a designated shape and orientation, a throat portion downstream of the inlet portion having a second cross-section less than the first cross-section of the inlet portion, and a diffusion portion downstream of the throat portion having a third cross-section greater than the second cross-section of the throat portion. A device is also positioned downstream from the diffusion portion of each helical channel for holding flame therein. In this way, a mixture of the fuel and air is continuously combusted downstream of the diffusion portion of each helical channel in a manner such that combustion gases exit therefrom with an increased pressure and temperature.

In a second exemplary embodiment of the invention, a method of providing continuous pressure rise combustion in a device is disclosed as including the following steps: providing at least one helical channel between a rotatable member and an outer wall spaced radially outwardly therefrom, each helical channel being disposed therethrough at a predetermined pitch angle to a longitudinal centerline axis extending through the rotatable member; providing air to each helical channel; providing each helical channel with an inlet portion having a first cross-sectional area for receiving a flow, a throat portion downstream of the inlet portion having a second cross-section less than the first cross-section of the inlet portion, and a diffusion portion downstream of the throat portion having a third cross-section greater than the second cross-section of the throat portion; providing a device for holding flame downstream from the diffusion area of each helical channel; providing air to each helical channel; providing fuel to each helical channel; initiating a shock structure within each helical channel; and, producing combustion gases in the diffusion portion of the helical channel which exit therefrom with an increased pressure and temperature.

In accordance with a third embodiment of the invention, a gas turbine engine is disclosed as including a fan section at a forward end of the gas turbine engine having at least a first fan blade row connected to a drive shaft and a continuous pressure rise combustion system for powering the drive shaft. The continuous pressure rise combustion system further includes: a rotatable member including a forward end, an aft end, a circumferential wall and a longitudinal centerline axis extending therethrough; an outer circumferential wall, wherein the rotatable member is positioned therein so that the circumferential wall of the rotatable member is spaced radially inwardly from the outer circumferential wall; at least one helical channel formed by a plurality of helical sidewalls extending between the circumferential wall of the rotatable member and the outer circumferential wall, each helical channel being open at the forward end and the aft end of the rotatable member so as to provide flow communication therethrough; an air supply for providing air to each helical channel; and, a fuel supply for providing fuel to each said helical channel. Each helical channel includes an inlet portion having a first cross-sectional area for receiving a flow having a designated shape and orientation, a throat portion downstream of the inlet portion having a second cross-section less than the first cross-section of the inlet portion, and a diffusion portion downstream of the throat portion having a third cross-section greater than the second cross-section of the throat portion. A device is also positioned downstream of the diffusion portion of each helical channel for holding flame therein. In this way, a mixture of the fuel and air is continuously combusted downstream of the diffusion portion of each helical channel in a manner such that combustion gases exit therefrom with an increased pressure and temperature. The gas turbine engine further includes a hub member coupled to the rotatable member and the drive shaft. A turbine may also be positioned downstream of the rotatable member and coupled to the drive shaft to extract power from combustion products exiting the rotatable member.

DETAILED DESCRIPTION OF THE INVENTION

Figure 1:
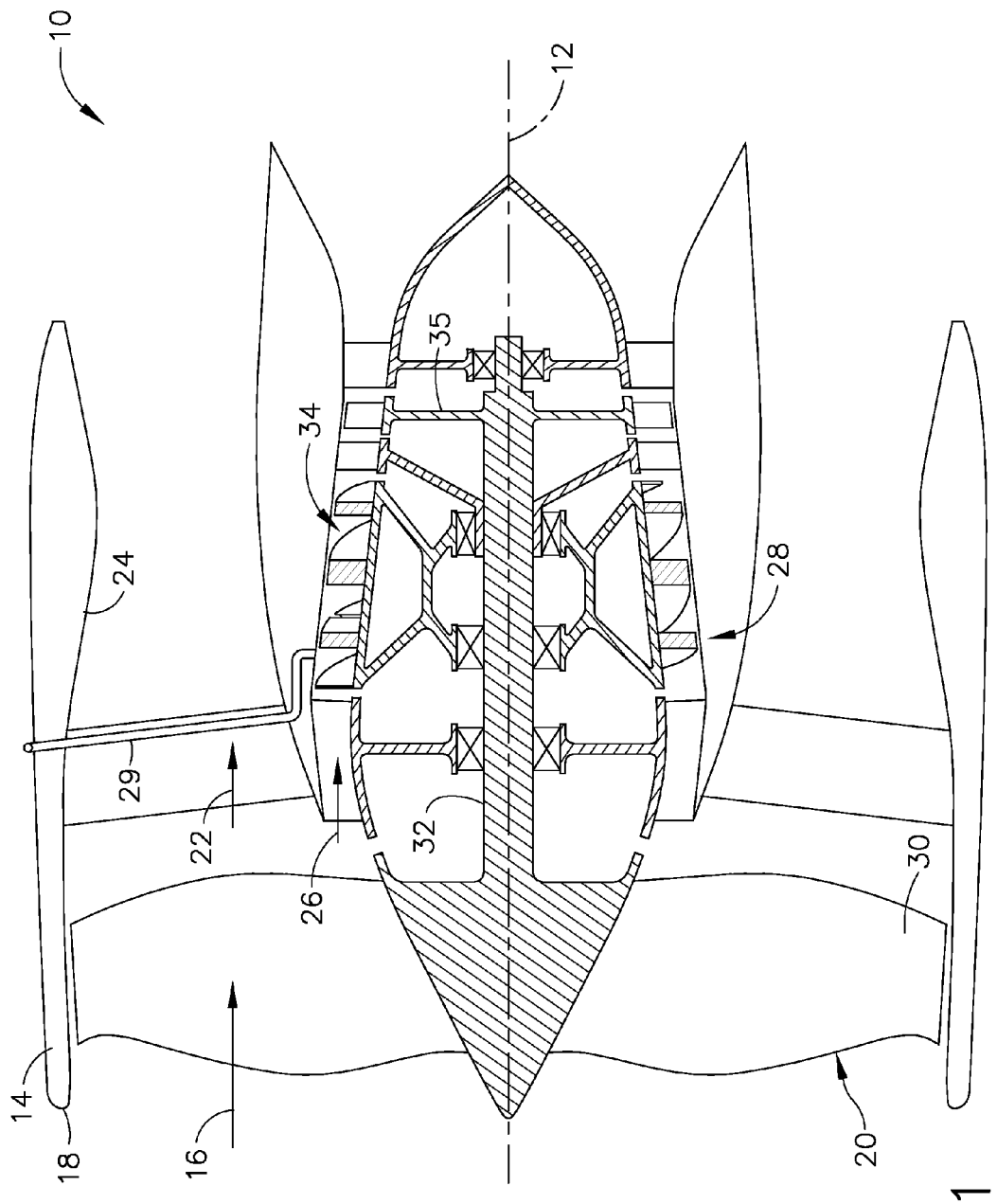
FIG. 1 is a longitudinal schematic sectional view of a gas turbine engine configuration including a compact gas generator for continuous pressure rise combustion, wherein fuel is provided from an outer radial position thereto.
Figure 2:
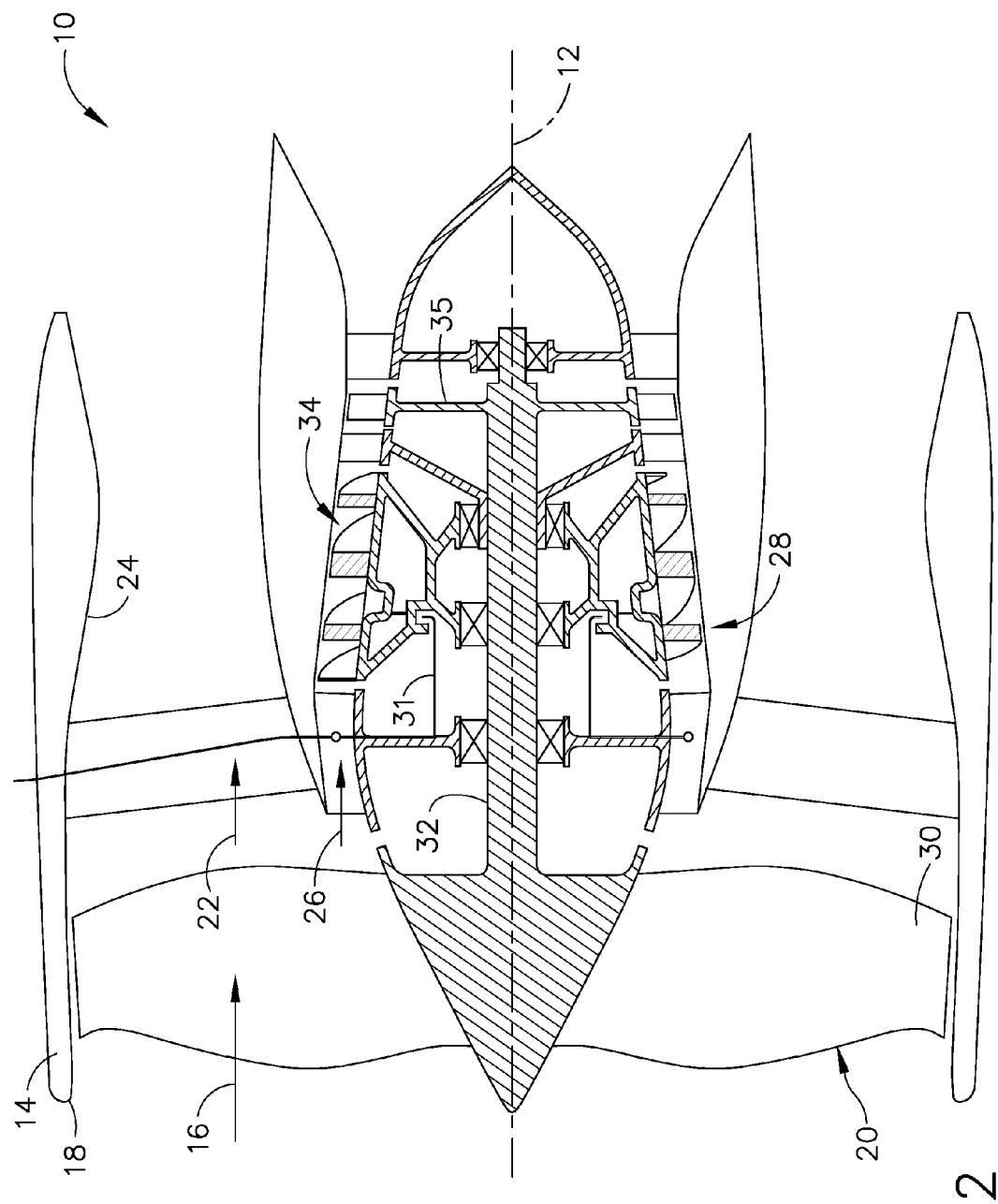
FIG. 2 is a longitudinal schematic sectional view of the gas turbine engine configuration including the compact gas generator depicted in FIG. 1, wherein fuel is provided from an inner radial position through the rotatable member.
Figure 3:
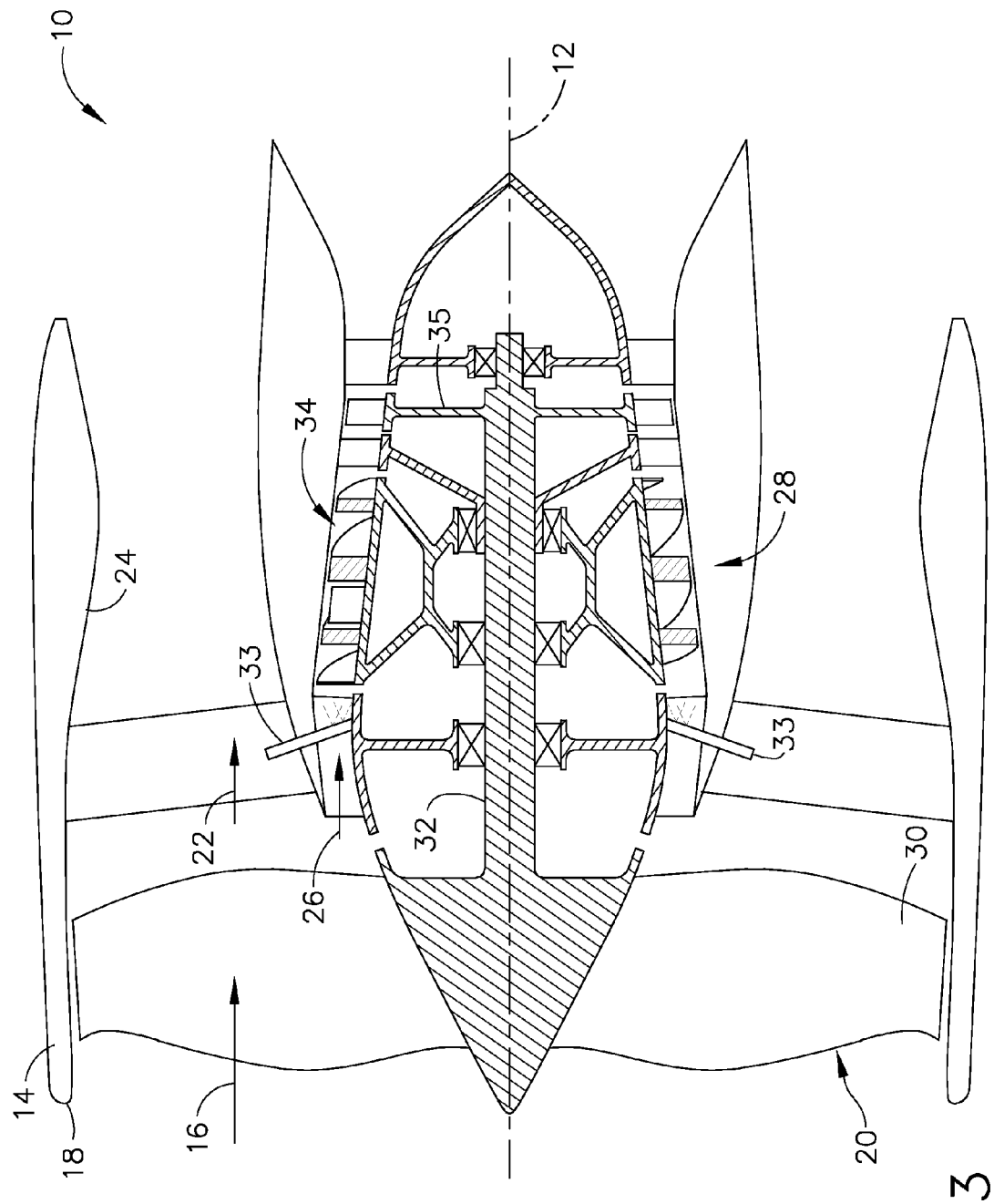
FIG. 3 is a longitudinal schematic sectional view of the gas turbine engine including the compact gas generator depicted in FIG. 1, wherein fuel is provided upstream thereof.

Referring now to the drawings in detail, wherein identical numerals indicate the same elements throughout the figures, FIGS. 1-3 schematically depict an exemplary gas turbine engine 10 (high bypass type) utilized with aircraft having a longitudinal or axial centerline axis 12 therethrough for reference purposes. Gas turbine engine 10 includes a nacelle 14 to assist in directing a flow of air (represented by arrow 16) through an inlet 18 to a fan section 20 as is well known. Air flow 16 is then split downstream of fan section 20 so that a first portion (represented by arrow 22) flows through an outer duct 24 and a second portion (represented by arrow 26) is provided to a compact gas generator 28. A first fan blade row 30 is also preferably connected to a drive shaft 32 which is preferably powered by means of a turbine 35 which receives high pressure combustion gases produced by compact gas generator 28.

Figure 4:
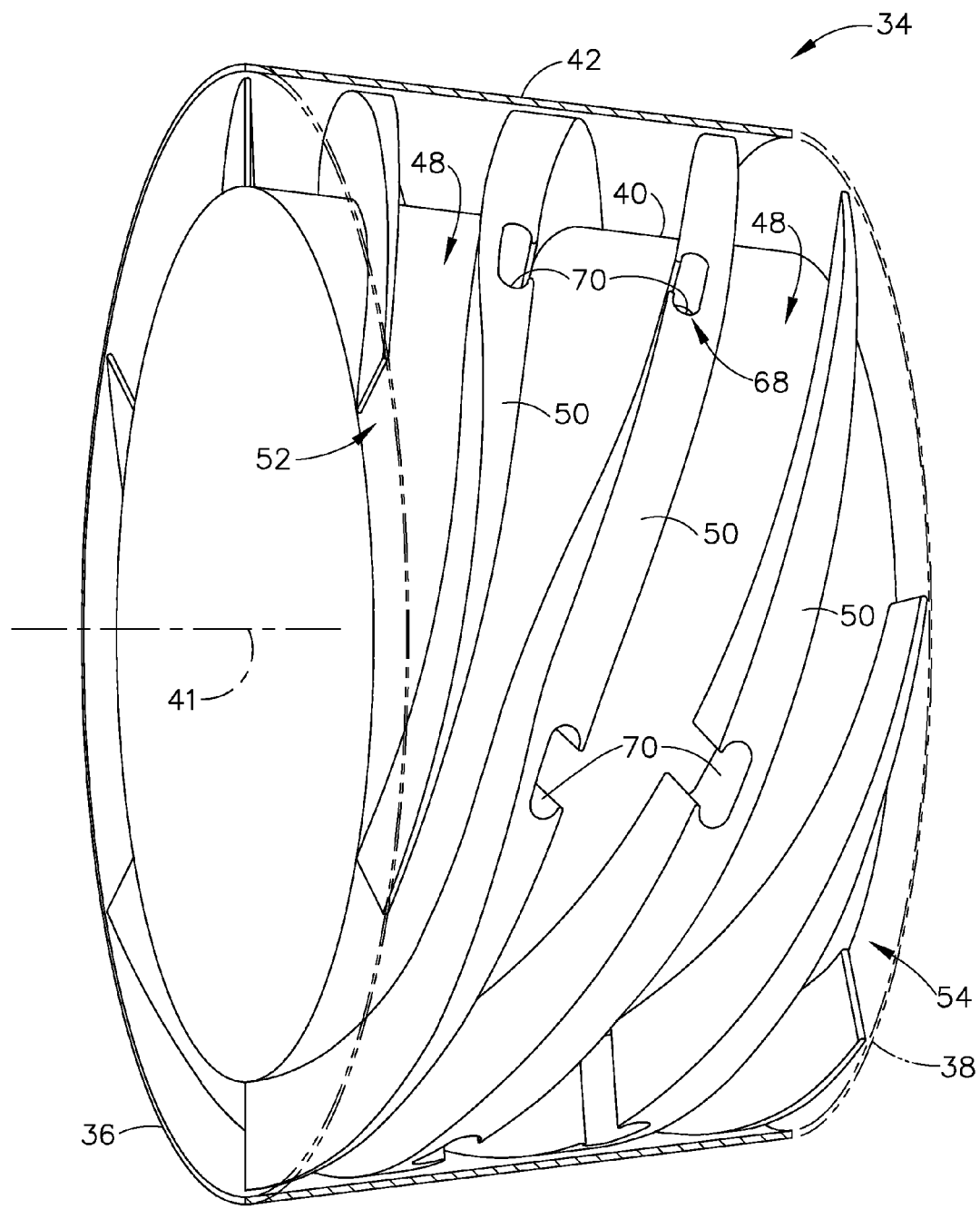
FIG. 4 is a perspective view of the compact gas generator depicted in FIG. 1, wherein trapped vortex cavities are formed in the helical sidewalls at specified locations.

More specifically, compact gas generator 28 includes a rotatable member 34 having a forward end 36, an aft end 38, a circumferential wall 40 and a longitudinal centerline axis 41 extending therethrough (see FIG. 4). An outer circumferential wall 42, which preferably is stationary but may also be rotatable, is preferably configured so that rotatable member 34 is positioned therein so that circumferential wall 40 of rotatable member 34 is spaced radially inwardly from outer circumferential wall 42. Rotatable member 34 and outer circumferential wall 42 preferably have a generally cylindrical shape, whereby circumferential walls 40 and 42 are substantially parallel from forward end 36 to aft end 38. It will be appreciated, however, that circumferential walls 40 and 42 need not be substantially parallel. As seen in FIG. 4, at least one helical channel (or passage) 48 is formed by a plurality of helical sidewalls 50 and extends between circumferential walls 40 and 42. It will be appreciated that each helical channel 48 is open at forward and aft ends 36 and 38 of rotatable member 34 so as to provide flow communication therethrough. Preferably a plurality of intertwined helical channels 48 are provided between circumferential walls 40 and 42 in order to provide a reasonable channel aspect ratio (i.e., height-to-width ratio).

Figure 6:
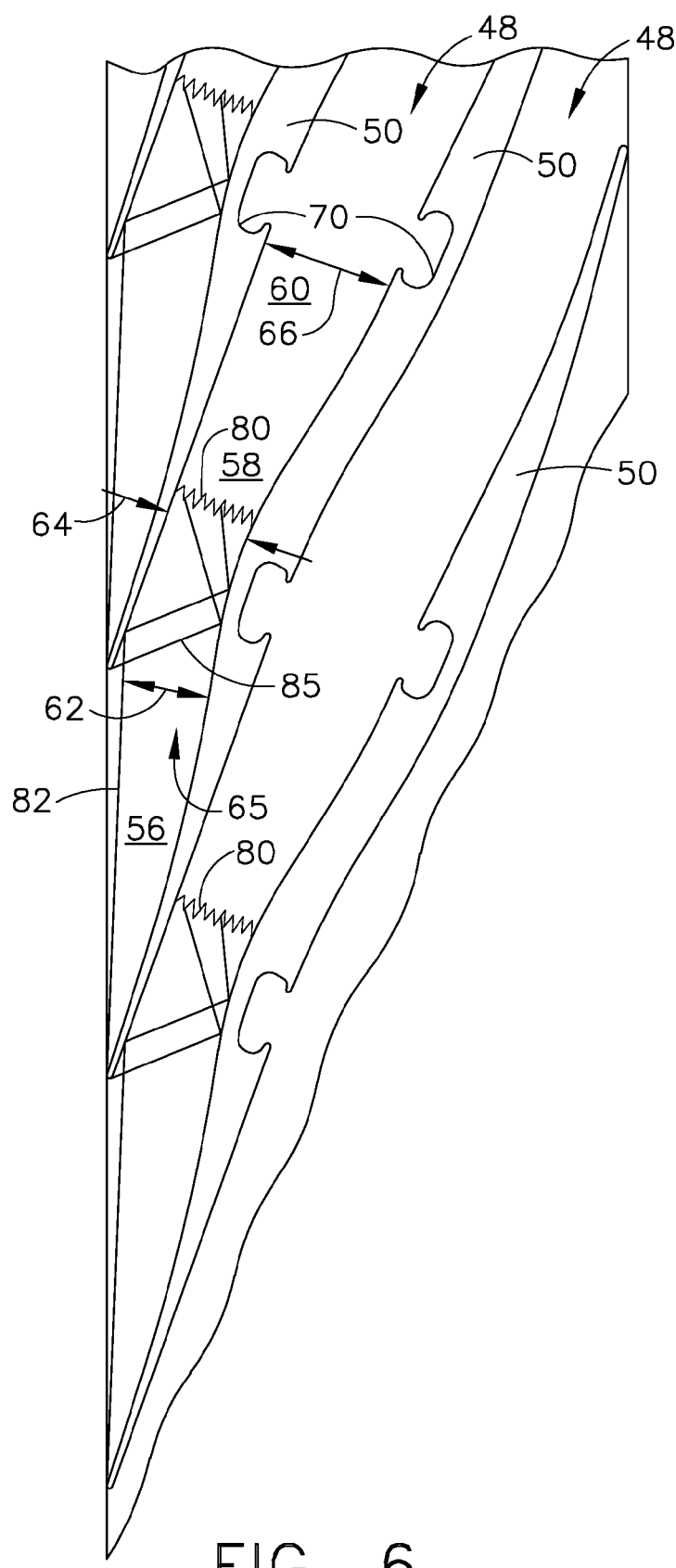
FIG. 6 is a rolled out view of a pair of flow channels in the compact gas generator depicted in FIGS. 4 and 5, wherein trapped vortex cavities are formed in the helical sidewalls at specified locations.
Figure 7:
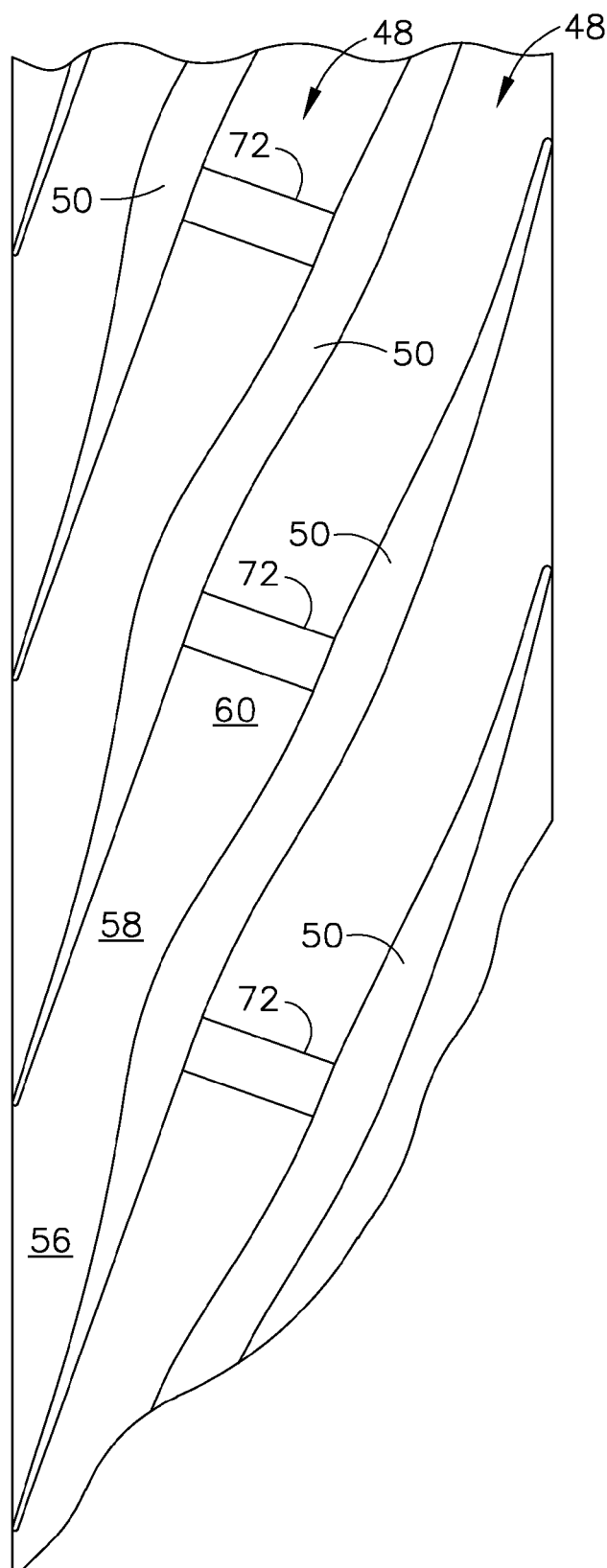
FIG. 7 is a rolled out view of a pair of flow channels in the compact gas generator similar to that depicted in FIG. 6, where trapped vortex cavities are formed in the circumferential wall of the rotatable member at specified locations.

Each helical channel 48 includes a first opening 52 located adjacent forward end 36 of rotatable member 34 and a second opening 54 located adjacent aft end 38 of rotatable member 34. Further, it will be appreciated from FIGS. 6, 7 and 9 that each helical channel 48 includes an inlet portion 56, a throat portion 58 downstream of inlet portion 56, and a diffusion portion 60 downstream of throat portion 58. Inlet portion 56 preferably has a designated shape and orientation for receiving a flow and has a first cross-sectional area 62. Throat portion 58 preferably has a second cross-section 64 less than first cross-section 62 of inlet portion 56. Diffusion portion 60 preferably has a third cross-section 66 greater than second cross-section 64 of throat portion 58. Due to the configuration of helical channels 48, the flow entering inlet portion 56 at a supersonic relative speed is slowed to a subsonic relative speed within diffusion portion 60. This is accomplished by an inlet shock structure 65 and also by reducing the relative swirl angle of helical channels 48 and/or introducing a radial divergence in the flow path downstream of throat portion 58.

In particular, it is preferred that inlet portion 56 be oriented at a predetermined pitch-line helix angle (e.g., a range of approximately 50-80°) with respect to longitudinal centerline axis 12 in a circumferential plane, where the pitch angle is preferably a function of a diameter for rotatable member 34, the rotational speed of rotatable member 34, and a speed of air entering helical channel 48. In order to facilitate fluid flow into and out of helical channel 48, the pitch angle is preferably designed so that incoming fluid is accepted cleanly into first opening 52 at design speed using a fluid velocity triangle approach and metal angle offset. Similarly, second opening 54 of helical channel 48 is preferably configured such that outgoing fluid resumes a substantially axial orientation in the absolute frame of reference.

Figure 5:
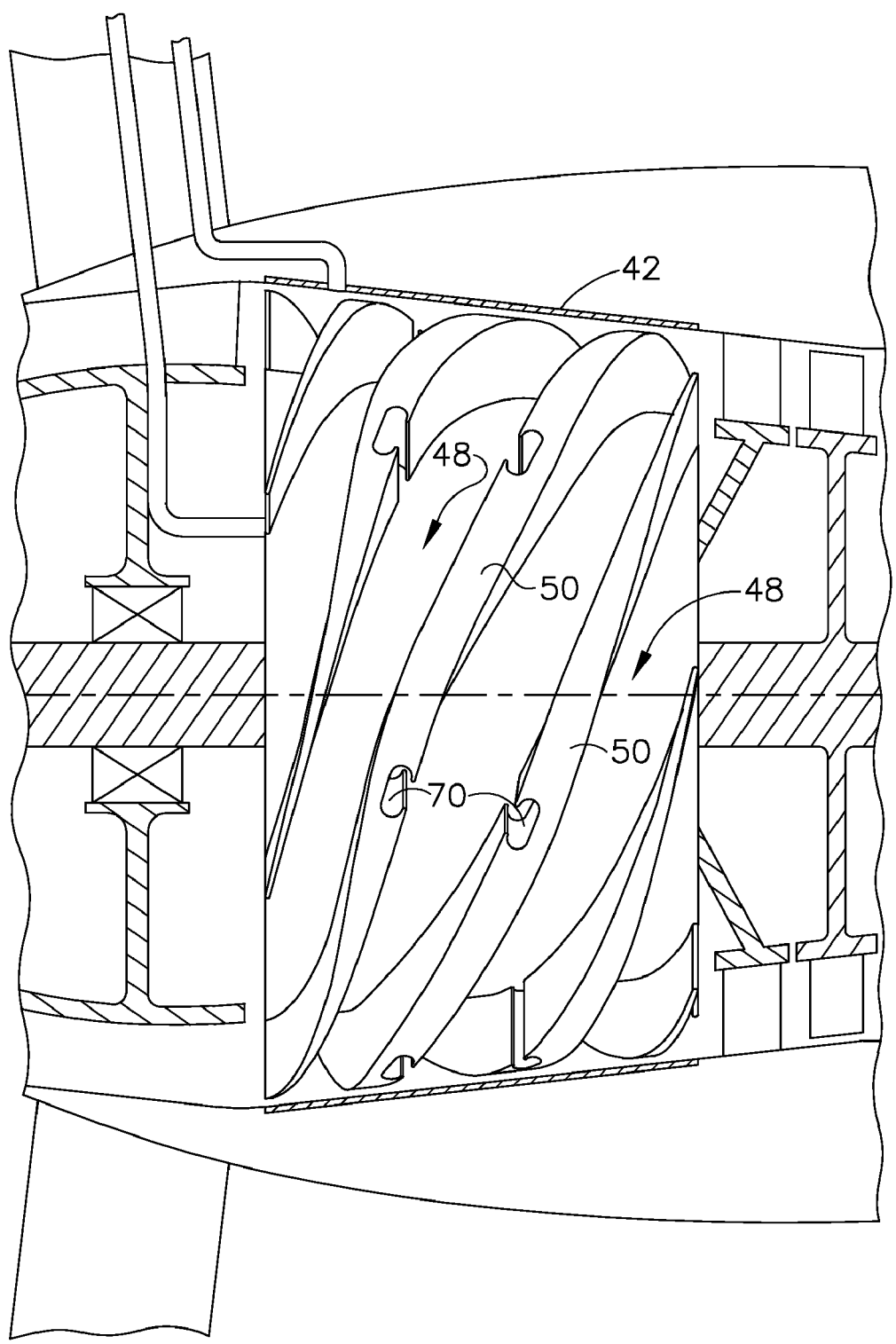
FIG. 5 is a partial longitudinal schematic view of the gas turbine engine depicted in FIG. 1, wherein a portion of the rotatable member of the compact gas generator is shown in perspective for clarity.
Figure 8:
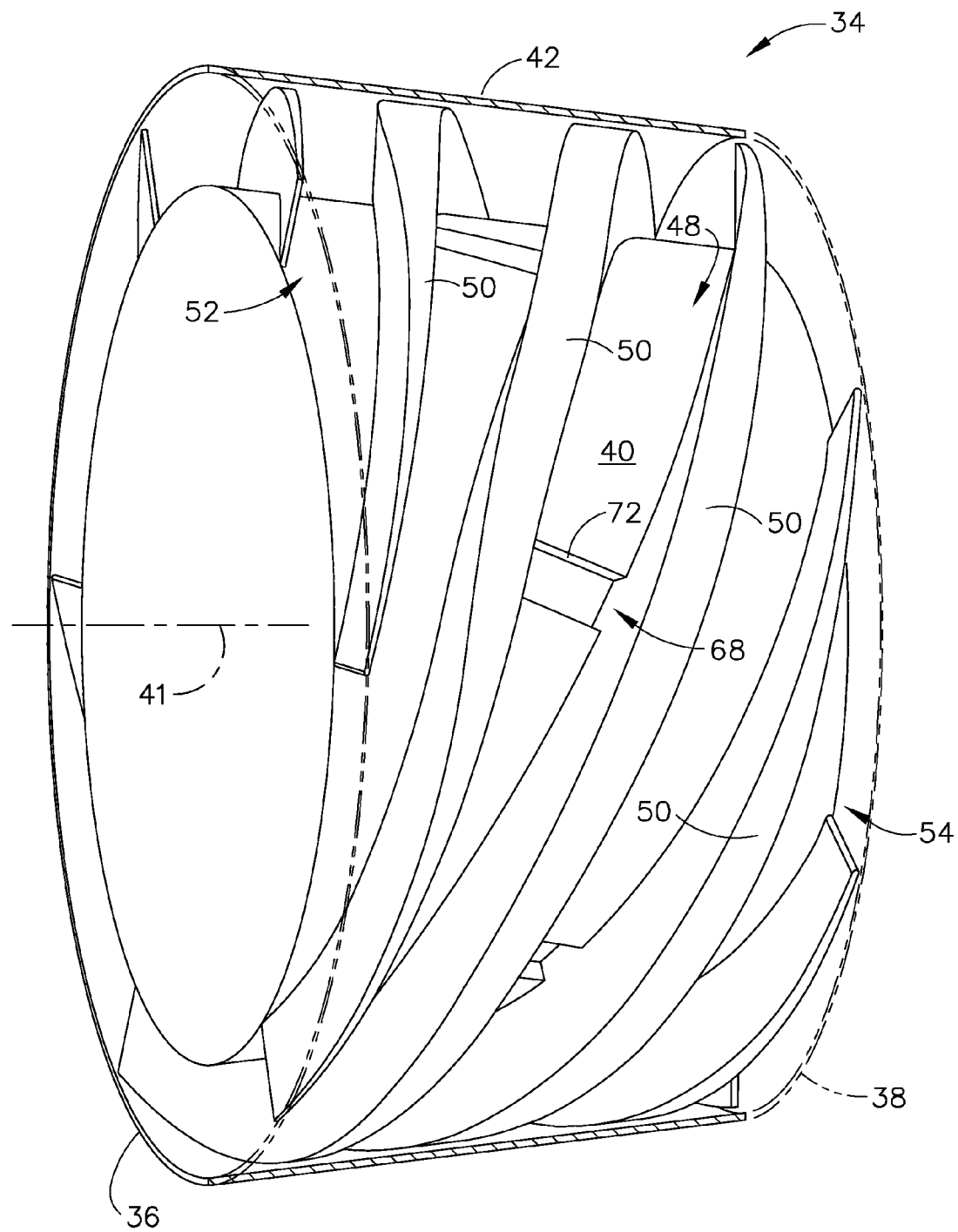
FIG. 8 is a perspective view of a compact gas generator similar to that depicted in FIG. 4, wherein trapped vortex cavities are formed in the circumferential wall of the rotatable member at specified locations.

In order to better promote a more stable combustion within helical channels 48, it is preferred that a device 68 be provided downstream of diffusion portion 60 within helical channels 48 for holding flame therein. In one embodiment, a trapped vortex cavity 70 is formed within at least one helical sidewall 50 of each helical channel 48 (see FIGS. 4-6). Alternatively, a trapped vortex cavity 72 is formed within circumferential wall 40 of rotatable member 34 (see FIGS. 7 and 8). It will be appreciated that use of trapped vortex cavities 70 and 72 may allow for a higher channel mach number downstream of diffusion portion 60 of helical channels 48, thereby reducing the amount of diffusion required upstream of combustion. Yet another embodiment for device 68 is a V-shaped gutter 74 attached to circumferential wall 40 of rotatable member 34 which extends radially outwardly into helical channel 48. It will be appreciated that a first portion 77 of gutter 74 is preferably oriented at an interior angle 81 in a range of approximately 25-40° with respect to a second portion 79 thereof (see FIG. 9). Gutter 74 is useful for enhancing the mixing of air and fuel within an area 83 between first and second portions 77 and 79. It will be understood that the configuration of device 68 is one consideration in determining the manner in which fuel is supplied to helical channels 48. It will be appreciated that fuel may be provided from an outer radial location via a supply 29 either within or downstream of diffusion portion 60 of helical channels 48 (FIG. 1), from an inner radial location via a supply 31 either within or downstream of diffusion portion 60 of helical channels 48 (FIG. 2), or upstream of helical channels 48 via a plurality of fuel injectors 33 (FIG. 3).

Figure 9:
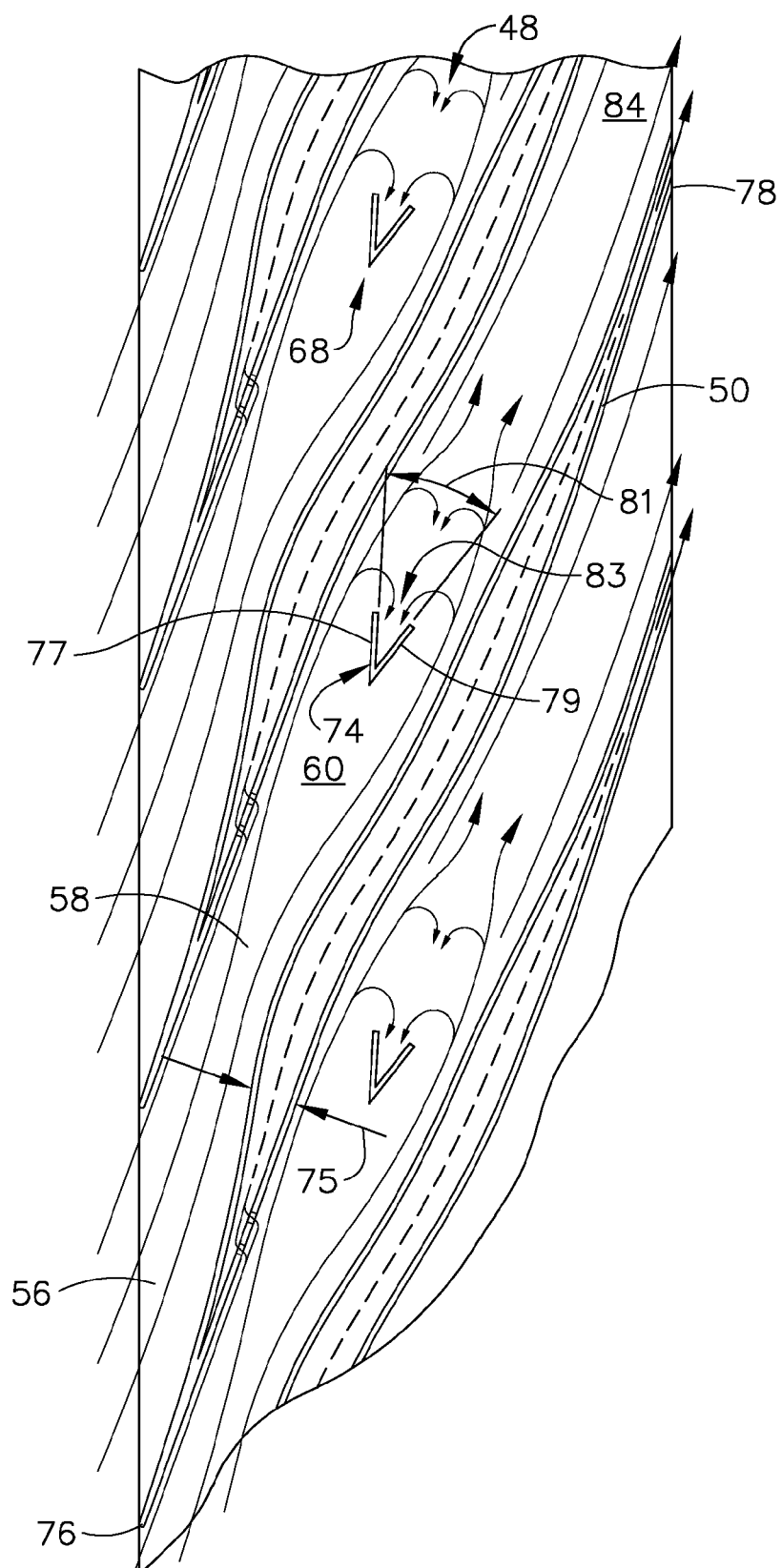
FIG. 9 is a rolled out view of a pair of flow channels in the compact gas generator similar to that depicted in FIGS. 6 and 7, wherein flameholders are provided on the circumferential wall of the rotatable member at specified locations; and, FIG. 10 is a diagram depicting temperature and entropy for a cycle utilizing the compact gas generator.

As best seen in FIG. 9, it is also contemplated that helical sidewalls 50 of each helical channel 48 have a thickness 75 with a hollow configuration so that air is permitted to flow therethrough for cooling purposes. In one such case, it will be seen that sidewalls 50 are open at forward ends 76 and aft ends 78 so that the flow of air continues from one end of gas generator 28 to the other. It is also possible that air may be supplied to sidewalls 50 at a different entry point and/or permitted to flow out at a different exit point.

Air and fuel are provided to each helical channel 48 in rotatable member 32, where it is preferably combusted downstream of diffusion portion 60. The air and fuel may be mixed prior to or after entering helical channel 48. In the latter case, fuel is injected from radially outside or radially inside of helical channel 48 (see FIGS. 1 and 2, respectively) at a predetermined location along longitudinal centerline axis 12. It will be appreciated that the combustion gases formed exit from helical channels 48 with an increased pressure and temperature. While not integral to the present invention, it is also preferred that the combustion gases will interact with helical sidewalls 50 of each helical channel 48 during and after combustion to create a torque offsetting the torque created by the inlet shock structure and sustaining the rotation of rotatable member 34.

With respect to inlet shock structure 65 (see FIG. 6), it will be seen that first and second oblique portions 82 and 85 are induced by the leading edges of sidewalls 50 and formed within inlet portion 56 of helical channel 48. A normal shock wave 80 is preferably formed downstream of throat portion 58 in helical channel 48 (within the relative frame thereof) and upstream of flame holding device 68. It will be appreciated that oblique shock portions 82 and 85 are preferably created in helical channel 48 by the supersonic rotational speed of helical channel 48.

Further, it will be understood that as the fuel-air mixture passes through shock structure 65 in inlet portion 56 of helical channels 48, the pressure of the mixture is substantially increased. During combustion, the fluid is energized by heat addition and expanded to a velocity near the relative inlet velocity. Following combustion, the vitiated fluid is slightly turned away from axial to provide the power input to rotatable member 34 necessary to overcome windage and other parasitic effects. In the engine frame of reference, the fluid exits aft end 38 of rotatable member 34 with a slight circumferential component in a direction opposite rotation of rotatable member 34.

An alternative means of igniting a fuel-air mixture within helical channel 48 is by an igniter (not shown), which may be positioned adjacent trapped vortex cavities 70 and 72, for example.

Figure 10:
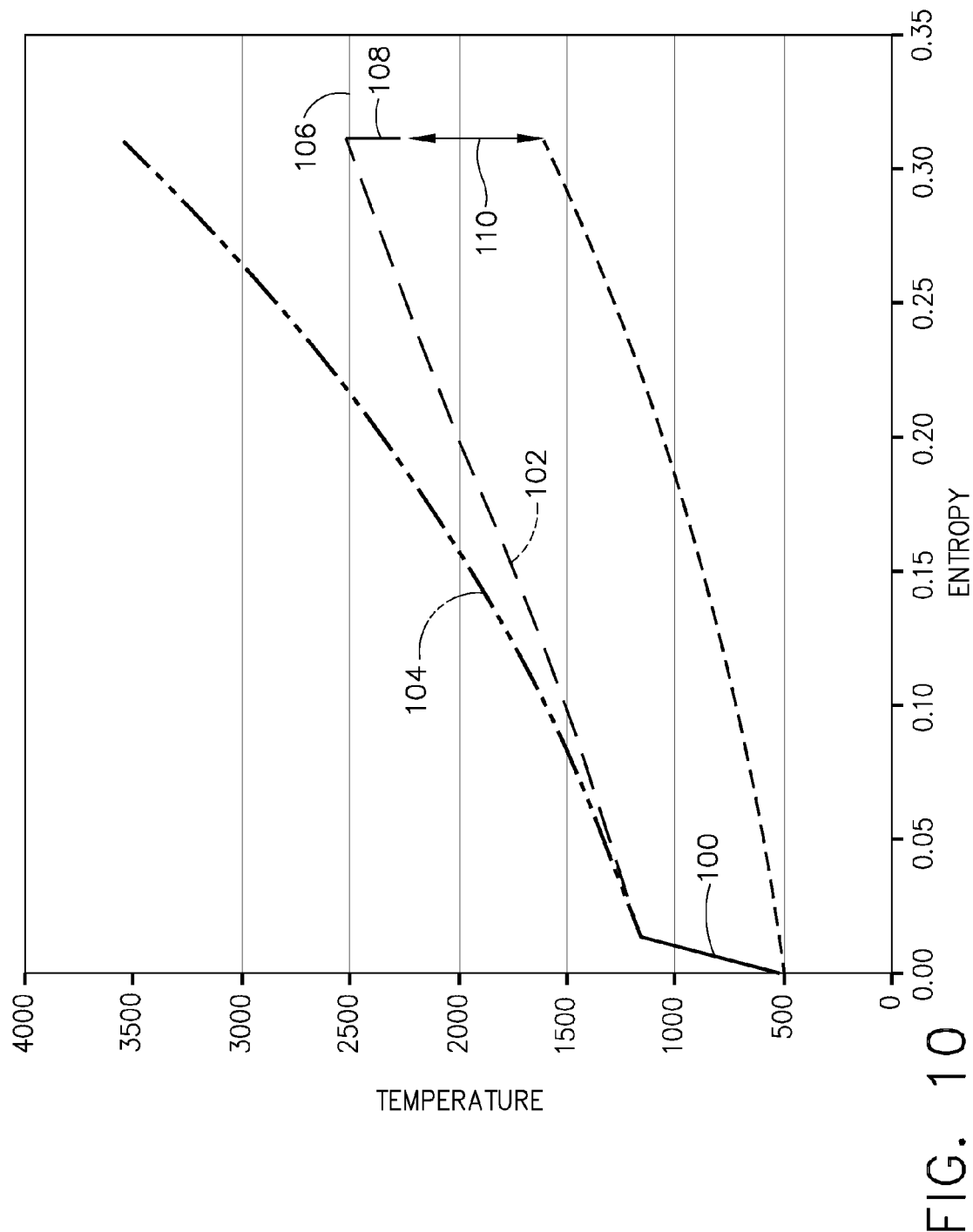

In order to demonstrate the thermodynamic process of compact gas generator 28, FIG. 10 depicts a temperature (T) versus entropy (S) diagram for the thermodynamic cycle of gas turbine engine 10 utilizing compact gas generator 28. This cycle is similar to the Brayton Cycle, but deviates as the combustion and work extraction processes occur simultaneously, thereby allowing for greater heat addition for the same maximum temperature. Increasing the heat addition relative to the Brayton Cycle produces a higher cycle net work for the same compression and maximum temperature, and possibly a higher thermal efficiency. As seen therein, compression (bold solid line) is identified generally by reference numeral 100 and reflects a temperature (and pressure) rise of the fluid entering gas turbine engine 10. A combustion/work extraction portion 102 thereof is indicative of combustion in and work extraction from gas generator 28 and generally conforms to the shape of isobaric curve 104 until an operating temperature 106 is reached. A third portion 108 represents a temperature (and pressure) drop resulting from an expansion of the fluid in the turbine. The amount of excess energy is then represented by arrow 110.

If the net shaft torque produced by compact gas generator 28 is capable of overcoming the parasitic torque induced by viscous effects, rotatable member 34 is able to sustain operation via its own power extraction without need of shaft power. In such case, if power imparted to the fluid by compact gas generator 28 is sufficient, it may be able to replace the entire high pressure core of a gas turbine engine. If the net shaft torque is insufficient to maintain rotational speed, compact gas generator 28 may be utilized instead of a typical combustion device in a gas turbine engine while still requiring assistance to maintain a desired rotational speed. This could be accomplished by means of a connection to a shaft driven by a turbine of the engine or by a device extraneous to such gas turbine engine.

It will also be appreciated that the present invention also involves a method of providing continuous pressure rise combustion in a device, which includes the following steps: providing at least one helical channel 48 between rotatable member 34 and circumferential wall 42 positioned radially outwardly thereto, where each helical channel 48 is disposed therethrough at a predetermined pitch angle to longitudinal centerline axis 41 extending through rotatable member 34; providing each helical channel 48 with an inlet portion 56 having a first cross-sectional area 62 for receiving a flow, a throat portion 58 downstream of inlet portion 56 having a second cross-section 64 less than first cross-section 62 of inlet portion 56, and a diffusion portion 60 downstream of throat portion 58 having a third cross-section 66 greater than second cross-section 64 of throat portion 58; providing a device 68 for holding flame downstream from diffusion portion 60 of each helical channel 48; providing air to each helical channel 48; providing fuel to each helical channel 48; initiating inlet shock structure 65 within a mixture of air and fuel in each helical channel 48; and, producing combustion gases downstream of diffusion portion 60 which exit from helical channel 48 with an increased pressure and temperature. Additional steps preferably include: causing rotatable member 34 to rotate at a predetermined speed prior to providing fuel to helical channel 48; controlling a rotational speed of rotatable member 34; and/or controlling a speed of air entering helical channel 48.

Having shown and described the preferred embodiment of the present invention, further adaptations of the combustor described herein can be accomplished by appropriate modifications by one of ordinary skill in the art without departing from the scope of the invention. Moreover, it will be understood that compact gas generator 28 may be utilized with other types of gas turbine engines not depicted herein.

What is claimed is:

1. A gas generator for providing continuous pressure rise combustion, comprising:
   (a) a rotatable member including a forward end, an aft end, a circumferential wall and a longitudinal centerline axis extending therethrough,
   (b) an outer circumferential wall, wherein said rotatable member is positioned therein so that said circumferential wall of said rotatable member is spaced radially inwardly from said outer circumferential wall;
   (c) at least one helical channel formed by a plurality of helical sidewalls extending between said circumferential wall of said rotatable member and said outer circumferential wall, each said helical channel being open at said forward end and said aft end of said rotatable member so as to provide flow communication therethrough, said helical channel further comprising:
      (1) an inlet portion for receiving a flow having a designated shape and orientation, said inlet portion having a first cross-sectional area;
      (2) a throat portion downstream of said inlet portion, wherein said throat portion has a second cross-section less than said first cross-section of said inlet portion; and,
      (3) a diffusion portion downstream of said throat portion, said diffusion portion having a third cross-section greater than said second cross-section of said throat portion;
   (d) a device positioned downstream from said diffusion portion of each helical channel for holding flame therein;
   (e) an air supply for providing air to each said helical channel; and,
   (f) a fuel supply for providing fuel to each said helical channel;
wherein a mixture of said fuel and air is combusted downstream of said diffusion portion of each said helical channel in a manner such that combustion gases exit therefrom with an increased pressure and temperature.

2. The gas generator of claim 1, said flame holding device comprising a V-shaped gutter extending radially outwardly from said circumferential wall of said rotatable member.

3. The gas generator of claim 1, said flame holding device comprising a trapped vortex cavity formed within at least one helical sidewall defining said helical channel.

4. The gas generator of claim 1, said flame holding device comprising a trapped vortex cavity formed within said circumferential wall of said rotatable member.

5. The gas generator of claim 1, wherein fuel is provided upstream of each helical channel.

6. The gas generator of claim 1, wherein fuel is provided from an outer radial location into said helical channel.

7. The gas generator of claim 1, wherein fuel is provided from an inner radial location into said helical channel.

8. The gas generator of claim 1, wherein flow through said helical channel transitions from a supersonic relative speed at said inlet portion to a subsonic relative speed in said diffusion portion.

9. The gas generator of claim 1, wherein an inlet region of each said helical channel is oriented at a predetermined pitch-line helix angle with respect to said longitudinal centerline axis in a circumferential plane.

10. The gas generator of claim 9, wherein said pitch-line helix angle of said helical channels is within a range of approximately 50-80°.

11. The gas generator of claim 1, wherein said rotatable member has a predetermined axial length.

12. The gas generator of claim 1, wherein a shock wave structure is formed in said helical channel.

13. The gas generator of claim 12, wherein said shock wave structure includes at least one oblique shock portion within said inlet portion of said helical sidewall.

14. The gas generator of claim 12, wherein said shock wave structure includes a normal shock wave formed downstream of said throat portion of said helical channel.

15. The gas generator of claim 1, wherein said circumferential wall of said rotatable member and said outer circumferential wall are substantially parallel from said forward end to said aft end of said rotatable member.

16. The gas generator of claim 1, wherein cooling passages are formed within said helical sidewalls.

17. A method of providing continuous pressure rise combustion in a device, comprising the following steps:
   (a) providing at least one helical channel between a rotatable member and an outer circumferential wall spaced radially outwardly therefrom, each said helical channel being disposed therethrough at a predetermined pitch angle to a longitudinal centerline axis extending through said rotatable member;
   (b) providing each helical channel with an inlet portion having a first cross-sectional area for receiving a flow, a throat portion downstream of said inlet portion having a second cross-section less than said first cross-section of said inlet portion, and a diffusion portion downstream of said throat portion having a third cross-section greater than said second cross-section of said throat portion;
   (c) providing a device for holding flame downstream of said diffusion area of each helical channel;
   (d) providing air to each said helical channel;
   (e) providing fuel to each said helical channel;
   (f) forming a shock wave structure in each said helical channel; and,
   (g) producing combustion gases downstream of said diffusion portion which exit from said helical channel with an increased pressure and temperature.

18. A gas turbine engine, comprising:
   (a) a fan section at a forward end of said gas turbine engine including at least a first fan blade row connected to a drive shaft; and
   (b) a continuous pressure rise combustion system for powering said drive shaft,
   said continuous pressure rise combustion system further comprising a gas generator including:
      (1) a rotatable member including a forward end, an aft end, a circumferential wall and a longitudinal centerline axis extending therethrough,
      (2) an outer circumferential wall, wherein said rotatable member is positioned therein so that said circumferential wall of said rotatable member is located radially inwardly from said outer circumferential wall;

(3) at least one helical channel formed by a plurality of helical sidewalls extending between said circumferential wall of said rotatable member and said outer circumferential wall, each said helical channel being open at said forward end and said aft end of said rotatable member so as to provide flow communication therethrough, said helical channel further comprising:
   (a) an inlet portion for receiving a flow having a designated shape and orientation, said inlet portion having a first cross-sectional area;
   (b) a throat portion downstream of said inlet portion, wherein said throat portion has a second cross-section less than said first cross-section of said inlet portion; and,
   (c) a diffusion portion downstream of said throat portion, said diffusion portion having a third cross-section greater than said second cross-section of said throat portion;

(4) a device positioned downstream of said diffusion portion of each helical channel for holding flame therein;

(5) an air supply for providing air to each said helical channel; and, (6) a fuel supply for providing fuel to each said helical channel;

wherein a mixture of said fuel and air is continuously combusted downstream of said diffusion portion of each said helical channel in a manner such that combustion gases exit therefrom with an increased pressure and temperature.

19. The gas turbine engine of claim 18, further comprising a hub member coupled to said rotatable member and said drive shaft.

20. The gas turbine engine of claim 18, further comprising a turbine downstream of said rotatable member and coupled to said drive shaft to extract power from combustion products exiting said rotatable member.

* * * * *